No. 735,436. PATENTED AUG. 4, 1903.
R. A. ANTHONY.
FLEXIBLE PHOTOGRAPHIC FILM.
APPLICATION FILED APR. 7, 1903.
NO MODEL.
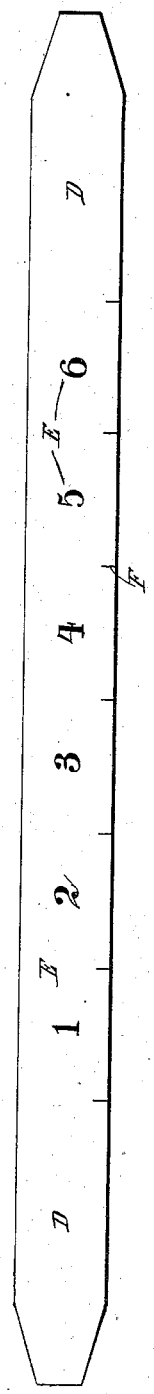
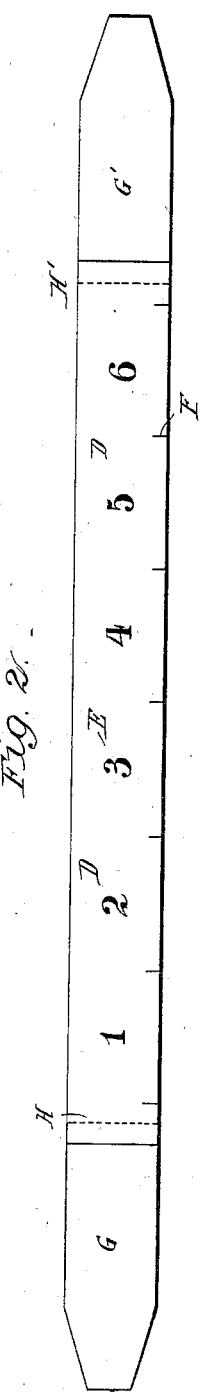

No. 735,436. Patented August 4, 1903.

UNITED STATES PATENT OFFICE.

RICHARD A. ANTHONY, OF NEW YORK, N. Y.

FLEXIBLE PHOTOGRAPHIC FILM.

SPECIFICATION forming part of Letters Patent No. 735,436, dated August 4, 1903.

Application filed April 7, 1903. Serial No. 151,440. (No model.)

*To all whom it may concern:*

Be it known that I, RICHARD A. ANTHONY, a citizen of the United States, and a resident of the borough of Manhattan, city, county, and State of New York, have invented certain new and useful Improvements in Flexible Photographic Films, of which the following is a full, clear, and exact specification, reference being had to the accompanying drawings, in which—

Figure 1 illustrates a plan view of the invention, showing the back of the completed product with the layer of colored insoluble material bearing the designations which indicate the number of exposures and the points at which to cross-cut the film to divide the several negatives or exposures. Fig. 2 illustrates a view the same as Fig. 1, in which, however, the film proper is shorter, the ends thereof being provided with pieces of opaque material, which being wrapped or coiled around the film will protect it against the action of light. Fig. 3 illustrates the film shown in Fig. 1, the several layers or coatings of material of which it is composed being arranged in proper order, but separated somewhat the better to show the construction. Fig. 4 illustrates a section of the film, the successive layers being enlarged, slightly separated, and projected beyond each other at both ends, so that the construction may still more plainly be seen.

A is the sensitized material. It is coated in any preferred manner upon a support made of nitrocellulose.

C is a thin layer or film of suitable material—such as wax, paraffin, or the like—by which the last layer D is attached to the back of the nitrocellulose support B. This last layer D is preferably composed of some insoluble material, such as insoluble gelatin, and it is treated in any suitable manner, preferably when in fluid or at least plastic condition, with suitable coloring-matter, whereby it is rendered either opaque or non-actinic in color in order that it may protect the sensitized surface against the action of light in the same manner and for the same purpose as the black paper in film-cartridges now extensively used protects the sensitized material in them. The several layers or coatings are preferably coextensive in all dimensions except thickness, and they may extend at one or both ends beyond the area or part taken up by the exposures, as indicated by the numerals E and cross-cutting designations F, (shown in Figs. 1 and 2,) or these layers and coatings may be only of such length as will provide area sufficient for the desired number of exposures, and then separate pieces of black paper G G' or equivalent opaque material may be pasted or otherwise attached at slightly-projecting ends H H' of the film proper, as shown in Fig. 2, these projecting pieces of opaque material serving to protect the sensitive material when wrapped or coiled about it.

I sometimes reduce the thickness of the nitrocellulose support as compared with the thickness now generally employed in film-cartridges, because owing to the attachment of the colored insoluble gelatin to it the bulk of the film proper is somewhat increased, and I prefer not to render it materially stiffer or more bulky than is now the practice. The reduction if made, however, should not be great, because when the colored insoluble gelatin is stripped from the nitrocellulose, as hereinafter explained, it should have body or stiffness enough to be conveniently manipulated during the subsequent steps in the photographic process.

The numerals and cross-cutting designations may be produced upon the insoluble and colored gelatin or similar backing-piece in a variety of ways, and also the several coatings or layers may be made and applied upon each other to form the completed product in a variety of ways. Detailed description, therefore, on these points need not be made.

The operation of the invention and the method of employing it in the taking of pictures is as follows: The film as a whole, composed of the sensitive surface, the support therefor, and the colored insoluble layer detachably attached to the support by the wax or equivalent material, as stated, is coiled up on a spool and is used in a camera during exposure in all respects the same as the well-known film-cartridges now in common use. After the exposures have been made the film is developed in any preferred manner, and if desired to develop it in a mechanical device, such as the McCurdy developing-box, then it will be noted that the annoying and at times detrimental operation of attaching the rear end of the film to the black paper or similar material now necessary with the cartridge-films most commonly in use is avoided, because under my invention the entire structure is up to this point integral, or rather attached together as a single strip. Therefore there is no loose end of the film which requires confinement. After development the insoluble colored backing layer or piece is stripped off from the support. This can easily be done, because the adhesive properties of the wax or like material is such that the attachment between the insoluble backing-strip and the nitrocellulose support is slight and they are readily separated. Thereupon the said support bearing the now developed picture upon it becomes a perfect transparent negative suitable for all the purposes required of it.

It will be obvious to those who are familiar with such matters that modifications may be made in the details of construction of the invention without departing from the essentials thereof—as, for example, a piece of ordinary black paper or other opaque or nonactinic fabric may be substituted for the insoluble and colored gelatin, it being detachably attached to the nitrocellulose support. I prefer such material as insoluble gelatin, however, for various reasons. I therefore do not limit myself to the details.

I claim—

1. A flexible photographic film embodying a sensitive layer applied to one side of a nitrocellulose support and a protective layer of colored insoluble material detachably attached to the opposite side of the support.

2. A flexible photographic film embodying a sensitive layer applied to one side of a nitrocellulose support, a protective layer of colored insoluble material detachably attached to the opposite side of the support and designating numerals or marks on the back of the protective layer.

3. A flexible photographic film embodying a sensitive layer applied to one side of a nitrocellulose support, a protective layer of colored insoluble material detachably attached to the opposite side of the support and means to exclude light attached at the ends of the film adapted to be coiled about the same when rolled up.

4. A flexible photographic film embodying a sensitive layer applied to one side of a nitrocellulose support, a protective layer of colored insoluble material detachably attached to the opposite side of the support, means to exclude light attached at the ends of the film adapted to be coiled about the same when rolled up, and designating numerals or marks on the back of the protective layer.

In testimony whereof I have signed my name to this specification in the presence of two subscribing witnesses.

RICHARD A. ANTHONY.

Witnesses:
L. S. VAN NOSTRAND,
F. A. ANTHONY.